US010642308B2

(12) United States Patent
Zajac

(10) Patent No.: US 10,642,308 B2
(45) Date of Patent: May 5, 2020

(54) ACTUATOR LOCKING MECHANISM

(71) Applicant: Hamilton Sundstrand Corporation, Charlotte, NC (US)

(72) Inventor: Piotr J. Zajac, Wroclaw (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 465 days.

(21) Appl. No.: 15/342,282

(22) Filed: Nov. 3, 2016

(65) Prior Publication Data
US 2017/0123448 A1 May 4, 2017

(30) Foreign Application Priority Data
Nov. 3, 2015 (EP) .................................... 15461574

(51) Int. Cl.
  G05G 5/00 (2006.01)
  F15B 15/26 (2006.01)
  B64D 41/00 (2006.01)
(52) U.S. Cl.
  CPC ........... G05G 5/005 (2013.01); B64D 41/007 (2013.01); F15B 15/261 (2013.01); *B64D 2041/002* (2013.01)
(58) Field of Classification Search
  CPC ................. G05G 5/005; B64D 41/007; B64D 2041/002; F15B 15/261
  See application file for complete search history.

(56) References Cited

U.S. PATENT DOCUMENTS

| 3,107,933 | A | * | 10/1963 | Royster | .................. | E21D 15/20 |
| | | | | | | 403/180 |
| 6,832,540 | B2 | | 12/2004 | Hart | | |
| 7,125,058 | B2 | | 10/2006 | Hawthorne | | |
| 8,640,563 | B2 | | 2/2014 | Lang et al. | | |
| 2013/0327207 | A1 | | 12/2013 | Sasscer et al. | | |
| 2013/0330121 | A1 | | 12/2013 | Sasscer et al. | | |
| 2014/0007757 | A1 | | 1/2014 | McMahon et al. | | |
| 2015/0167702 | A1 | | 6/2015 | Ozanich et al. | | |
| 2015/0232195 | A1 | * | 8/2015 | Bannon | ................ | B64D 41/007 |
| | | | | | | 92/15 |

FOREIGN PATENT DOCUMENTS

EP   2636929 A2   9/2013

OTHER PUBLICATIONS

European Search Report for Application No. 15 46 1574, dated May 9, 2016. 9 Pages.

* cited by examiner

*Primary Examiner* — Vicky A Johnson
(74) *Attorney, Agent, or Firm* — Cantor Colburn LLP

(57) ABSTRACT

An apparatus for unlocking an actuator, such as a RAT actuator includes a first member; and a second member movable between a blocking position in which said second member is engaged with said first member so as to block movement of said first member and an unblocking position in which said second member is disengaged from said first member so that movement of the first member is not blocked. The first member is an arm arranged such that in the blocking position it is disposed between said second member and a lock release element of said actuator.

14 Claims, 5 Drawing Sheets

- Prior Art -

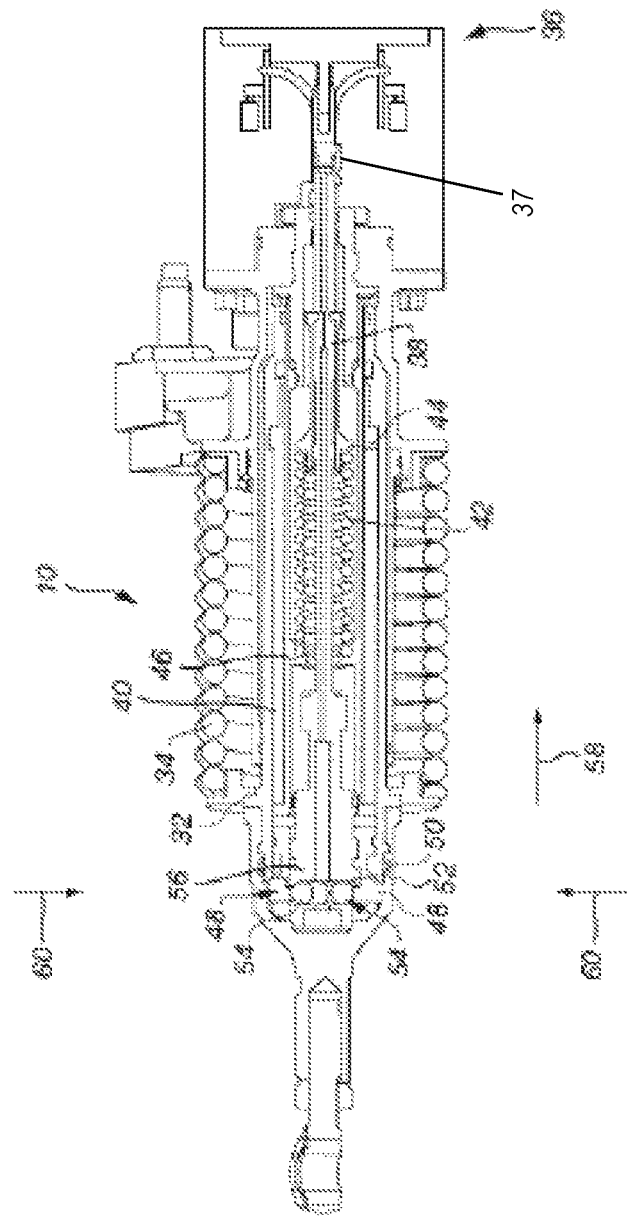

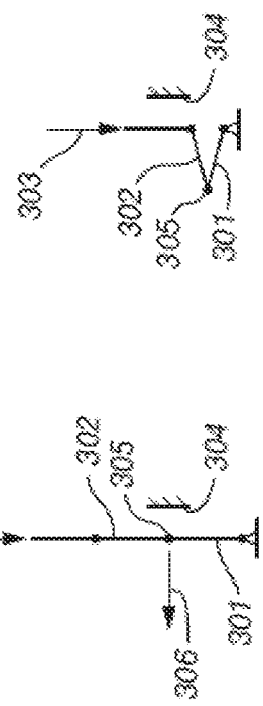
Fig. 3A - Prior Art -
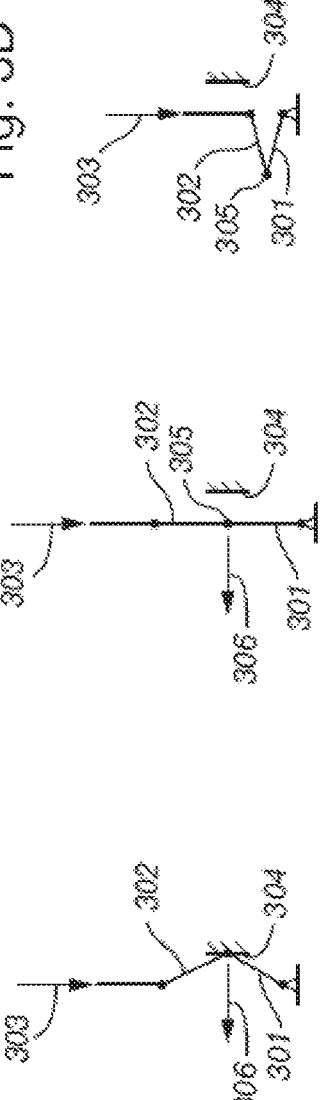
Fig. 3B - Prior Art -
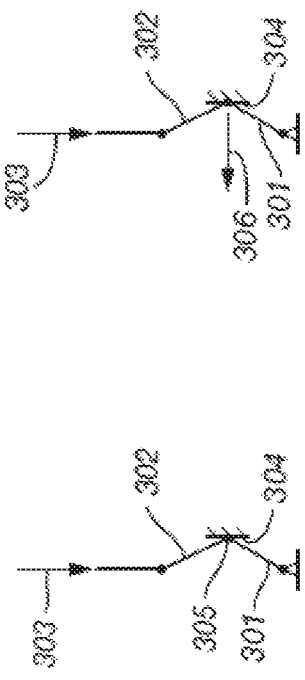
Fig. 3C - Prior Art -
Fig. 3D - Prior Art -
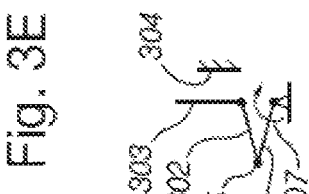
Fig. 3E - Prior Art -
Fig. 3F - Prior Art -
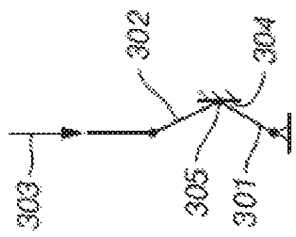
Fig. 3G - Prior Art -

ACTUATOR LOCKING MECHANISM

FOREIGN PRIORITY

This application claims priority to European Patent Application No. 15461574.4 filed Nov. 3, 2015, the entire contents of which is incorporated herein by reference.

TECHNICAL FIELD

This disclosure relates to actuator locking mechanisms, and in particular to a locking mechanism for a ram air turbine (RAT) actuator.

BACKGROUND

Ram air turbines are used in aircraft to provide electric and/or hydraulic power to components of the aircraft, for example in the event of failure of other electrical or hydraulic power generating equipment on board the aircraft. In normal operation of the aircraft, the RAT is housed within the aircraft, but when needed it is extended into the airflow around the aircraft such that it may turn and generate electrical and/or hydraulic power. The RAT is typically pivoted into position by means of an actuator, for example a hydraulic actuator. The actuator typically includes a piston which extends to deploy the RAT. The actuator has a lock mechanism which prevents inadvertent movement of the piston and thus inadvertent deployment of the RAT. The locking mechanism typically comprises a spring loaded lock piston which must be moved in an axial direction to unlock the actuator. Such a mechanism is disclosed for example in US 2013/0327207 A1.

An unlocking mechanism is provided to permit this movement. Typically, the unlocking mechanism comprises a two link, knee type linkage one end of which is rotatably coupled to one end of the locking piston and the other end of which is axially fixed and rotatably coupled to a support. A linear solenoid moves the linkage between a locked and an unlocked position. However, in moving between the two positions, the linkage must go "over centre" and initially displace the lock piston against the force of the lock piston spring, which means that a relatively large solenoid may be necessary.

As weight is of concern in aircraft, it would be desirable to provide a locking mechanism which may potentially be lighter.

A further problem with the over-centre mechanism and the high force required from the solenoid is that the solenoid's field is non-linear. Therefore an accurate positioning of the solenoid's plunger within the coil is necessary in order to keep the size (and weight) of the solenoid to a minimum. However, this reduced tolerance adds cost to installation by requiring more accurate positioning.

SUMMARY

According to this disclosure there is provided apparatus for unlocking an actuator, the apparatus comprising: a first member; and a second member movable between a blocking position in which said second member is engaged with said first member so as to block movement of said first member and an unblocking position in which said second member is disengaged from said first member so that movement of the first member is not blocked; wherein the first member is an arm arranged such that in the blocking position it is disposed between said second member and a lock release element of said actuator.

As the arm is simply blocked by the second member in the blocking position, the only force that needs to be overcome in order to unlock the actuator is the friction between the first and second members. Thus by contrast with previous over-centre type mechanisms, there is no need to provide an unlocking force sufficient to overcome the biasing force of the lock release element. Thus the strength (and therefore the size and weight) of the unblocking actuation device (such as a solenoid) needed to move the second member can be significantly reduced. A further advantage of this is that the smaller unblocking actuation device can still provide more than sufficient force for the required operation of the second member. Therefore it does not need to be calibrated to such an exact operating state as was previously required for larger unblocking actuation devices (to keep their size and weight down). This facilitates manufacture and assembly. The unblocking actuation device may alternatively be referred to as a second member moving device or an arm (or first member) unblocking device.

Moreover, the arm can be designed to contact the second member with a small contact area that minimises the friction force that needs to be overcome, again allowing the use of smaller unblocking actuation devices and/or less calibration for the second member.

The first member is preferably curved such that in use a blocking force from the second member in the blocking position is in a substantially different direction from a force applied by the lock release element. This provides greater flexibility on the arrangement of the unblocking actuation device such as the orientation of the unlocking actuation devices that operate to move the second element between its two positions. In particularly preferred arrangements, the change of direction is around 90 degrees. This is particularly advantageous in actuators for safety critical systems where redundancy is required as a fail safe mechanism. For example in aerospace applications, redundant systems are typically used in case one component fails. In such arrangements, two arms (i.e. two first members) may be used, each engaging with the second member so that breakage of one arm does not result in accidental operation of the actuator (e.g. accidental deployment of a RAT apparatus). Multiple second members may also be used, although in some preferred examples a single second member can engage with a plurality of first members, for example by surrounding or encircling them.

When the second member is moved to the unblocking position the arm is no longer blocked and can move past the second member, thus permitting movement of the lock release element. In some preferred examples, the curve shape of the arm may be selected such that as the arm moves past the second member its curvature causes its unblocked end to move into a space adjacent to the second member. This space may also be adjacent to the actuation device(s) and is a space that is not generally used for other components. Thus this arrangement is compact and space efficient.

Preferably the second element is arranged to slide with respect to the first element when moving between the blocking and unblocking positions. The friction between the first and second elements can be modified for example by changing the surface roughness of either component. In some examples the friction coefficient can be minimized by using different materials and/or polished surfaces. In some examples rollers may be built into the arm as the rolling friction is much smaller than in the case where two mating surfaces slide on each other.

As discussed above, the apparatus may further comprise an unblocking actuation device arranged to move the second element from the blocking position to the unblocking position. Again, in safety critical systems this is a component that will likely be duplicated for redundancy. The use of a single, rather than plural, second elements is advantageous here as the redundant unblocking actuation devices both act on the same second element and thus either unblocking actuation device can be used to move the second element and disengage all first elements engaged therewith. Thus failure of a single unblocking actuation device (e.g. solenoid) will not result in overall system failure. Indeed three or more arms and/or unblocking actuation devices may be provided for even greater redundancy, but every component adds weight which is undesirable in many applications (particularly in aircraft) and therefore duplex systems are generally considered sufficiently redundant.

The unblocking actuation device may be a solenoid that can be triggered electrically. As discussed above, with the lower strength required of these solenoids to effect actuation, their size can be reduced significantly compared with previous over-centre systems and they also require less calibration to align the solenoid piston within the solenoid coil to obtain the maximum possible actuation force without weight increase.

The second member may be a hollow cylinder in some examples, preferably of circular cross-section, with the first member arranged inside the cylinder. The cylinder could be of any cross-sectional shape, such as square or triangular, but circular cylinders are generally easier for manufacture and assembly.

The apparatus preferably further comprises a base member concentric with the cylindrical second member and overlapping therewith at least in the blocking position. This raised base and overlap creates a guide for movement of the second element between its blocking and unblocking positions. Preferably the overlap remains even when the second element is in the unblocking position, with a greater overlap between the two parts in the blocking position. For example, in the case of a hollow circular cylindrical second member, the base member may take the form of a raised circular pedestal of slightly smaller diameter than the cylinder so that the base member just fits inside the second member.

Preferably in the blocked position, the curved first member is in contact with the base member. Preferably the curve rather than the ends is in contact with the base member.

The cylindrical second member may have a notch in its wall through which a portion of the first member projects when in the blocking position. If more than one first member is provided, the second member will preferably have a notch for each first member. Preferably the first member has a substantially L-shaped end that engages with the second member in the blocking position, one face of the L-shaped end being arranged to abut the inside wall of the second member to block movement of the first member, and the other face of the L-shaped end being arranged to project through the notch such that the notch of the second member rests thereon in the blocking position.

With this arrangement, the first and second members together define a precise cross-sectional area for friction to overcome and a precise (and reliable) distance (and therefore time) for unblocking to be achieved. This is very important in safety critical systems to be able to achieve excellent reliability and to be certain of the exact distance of operation that is required for actuation. This can be a problem due to manufacturing and assembly tolerances. For example, if the second member were to rest on another surface, other than the first member, the tolerances in the manufacture of the second member would affect the distance that the second member would need to be raised in order to disengage the first member. This provides uncertainty which either reduces reliability or requires compensation by other components (e.g. bigger or more powerful unblocking solenoids). By contrast, when the second member rests on the first member, the relationship between the two is well defined. The disengagement distance and the frictional contact area are defined only by the shape of the end of the first member and can be easily controlled to be within the required tolerances for a particular actuator.

This disclosure extends to an actuator comprising an unlocking apparatus as described above, optionally including any of the preferred features also described above. Preferably the actuator is a RAT (Ram Air Turbine) actuator, although it will be appreciated that the unlocking apparatus is also applicable to other actuators which provide a preload force that in the locked state is resisted by a locking/unlocking mechanism.

According to a further aspect, this disclosure provides a method of unlocking an actuator comprising: moving a second member from a first position in which it engages with a first curved member so as to block movement of said first member by providing a force in a direction substantially different from the direction of a force from a lock release mechanism of said actuator and a second position in which movement of the first member is not blocked.

Any or all of the preferred features described above in relation to the unlocking apparatus apply equally to the method of unlocking an actuator.

BRIEF DESCRIPTION OF DRAWINGS

One or more non-limiting examples will now be described, by way of example only, and with reference to the accompanying figures in which:

FIG. 2 shows a cross-section of a RAT actuator;

FIGS. 3a-3g. illustrates unlocking and locking of an over-centre type unlocking mechanism;

DETAILED DESCRIPTION

Figure 1:
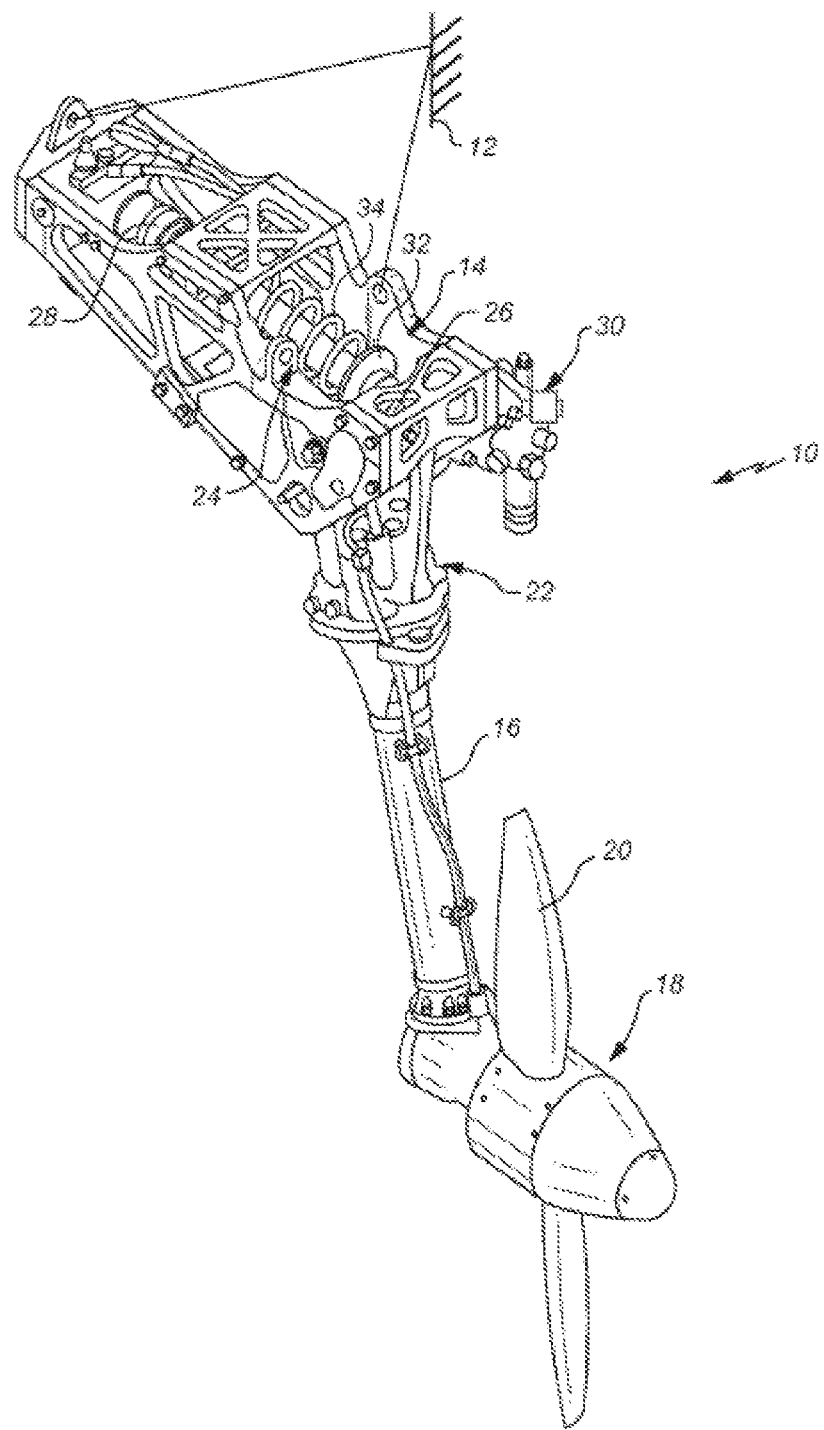
FIG. 1 shows a RAT system.

FIG. 1 illustrates an RAT system 10 which is secured to an aircraft structure 12 by a housing 14. The housing 14 pivotally supports a strut 16 having a turbine 18 at one end. The turbine 18 includes blades 20, which impart rotational drive to a generator 22 and hydraulic pump 30 for example. An actuator 24 is secured to the strut at a first end 26 and to the housing at a second end 28. The actuator 24 is illustrated in its deployed position.

The actuator 24 comprises a cylinder 32 which is biased by a spring 34 in order to deploy the strut 16. When the cylinder 32 is retracted, it is held in its retracted position by means of a locking mechanism 36, details of which will be described with reference to FIGS. 4 to 7.

With reference to FIG. 2, the locking mechanism comprises a locking piston or bolt 38 which is received slidably within a sleeve 40. The locking piston 38 is biased to the right in the sense of FIG. 2 by means of a biasing spring 42 which extends between a seat 44 provided on the locking piston 38 and a seat 46 provided on the sleeve 40.

The extensible cylinder 32 of the actuator is slidably mounted around the sleeve 40. Extension of the cylinder 32 is prevented by locking elements 48 mounted at the end of the sleeve. In the locking position, respective shoulders 50, 52 of the cylinder 32 and locking wedges 48 engage to prevent axial movement of the cylinder 32.

A number of rollers 54 are mounted in the distal end 56 of the locking piston 38. However, it will be noted that when the locking piston 38 is moved to the right in a direction of arrow 58, the wedges 48 may displace in the direction of arrows 60 thereby disengaging the shoulders 50, 52 and allowing the cylinder 32 to extend to deploy the RAT.

When locked in the retracted position, the locking piston 38 is prevented from such movement by an unlocking mechanism that will be described further below in relation to FIGS. 4 to 7.

FIG. 3 illustrates an existing unlocking mechanism of the over-centre type as used in a RAT uplock mechanism. FIG. 3A-D illustrate the unlocking movement while FIG. 3E-F show the locking movement.

In FIG. 3, the toggle mechanism 300 is formed from two pivoted parts 301, 302. The force from the internal spring 303 (e.g. the biasing spring 42 shown in FIG. 2) provides a force that biases the two pivoted parts 301, 302 to compress (or fold) together. Starting from the locked state shown at A, the knee 305, i.e. the pivot point of the two parts 301, 302 is prevented from further movement by resting against damper 304. This prevents further compression or folding of the two parts 301, 302, thus holding the mechanism 300 in the locked state. To unlock the mechanism 300, the knee 305 must be moved away from the damper to allow full compression of the two parts 301, 302 as shown at D. However, to attain that position, the two parts 301, 302 must first be fully straightened, which requires pushing back against the biasing spring 303. Therefore a sufficiently strong force must be applied to the knee 305 to overcome the biasing force of spring 303. This may be provided by a solenoid 306 acting on the knee 305 as shown at B. As the solenoid pulls the knee 305 across, the biasing spring is pushed upwards until the parts 301, 302 are fully straight as shown at C. This is the tipping point at which the maximum force is required from the solenoid 306. Pulling the knee 305 further to the left (in FIG. 3) allows the biasing spring 303 to compress the parts 301, 302 fully, disengaging the lock. In the case of a RAT locking mechanism this unlocking procedure permits deployment of the RAT by the main spring 32 shown in FIG. 1.

FIG. 3E-F show the reverse procedure in which the locking mechanism is engaged from the unlocked position. During the deployment procedure, the internal biasing spring 303 ceases to provide a biasing force on the parts 301, 302 due to movement of other parts of the RAT mechanism. Therefore starting from the state shown at E, an internal spring 307 (which has a lower biasing force than the internal spring 303 and thus does not prevent the unlocking process of A-D) acts on the parts 301, 302 to move them back through the maximally extended state F and into the locked state G with the knee 305 held in place against the damper 304. Thus when the RAT mechanism is retracted, the biasing force once again adds its force to keep the locking mechanism 300 in this locked state G (which is the same as state A).

Figure 4:
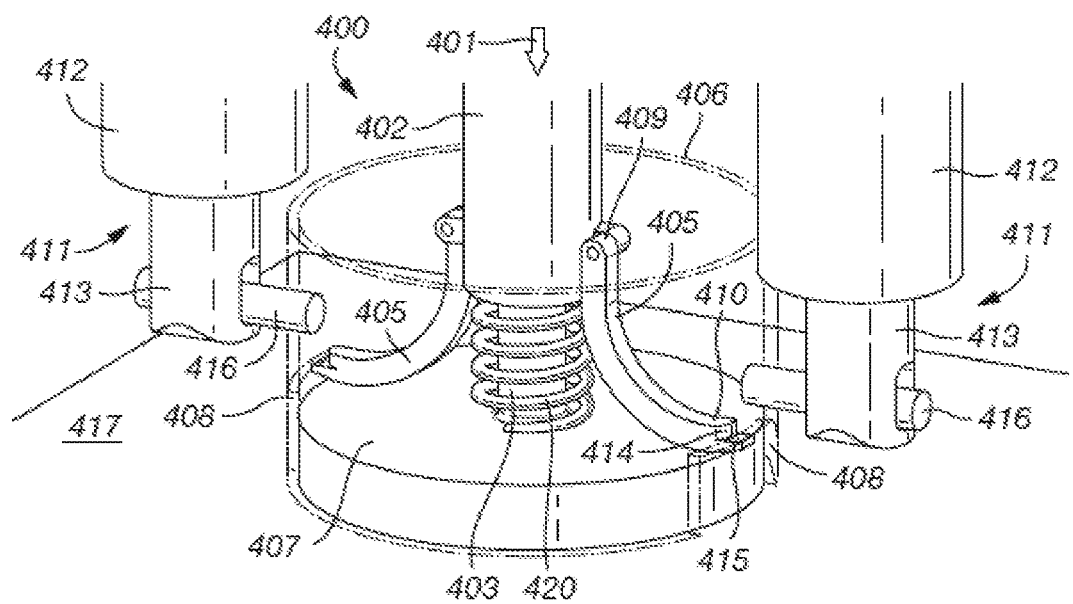
FIG. 4 shows an unlocking mechanism in the locked position.

FIG. 4 shows an example of an unlocking mechanism 400 in the locked position. In this locked position the unlocking mechanism 400 is designed to prevent movement of a lock release mechanism 37 (shown in FIG. 2) of the RAT actuator. In order to release the RAT actuator and permit deployment of the RAT actuator, the lock release mechanism 37 must move in the direction shown by arrow 401. The unlocking mechanism 400 has a sleeve 402 which slides on a fixed shaft 403. An end face 404 of sleeve 402 engages with the lock release mechanism 37 so as to prevent movement in the direction of arrow 401. The lock release element 37 is biased against the face 404 by an internal spring in the actuator.

The unlocking mechanism 400 has two curved (or arc-shaped) arms 405 (first members), each of which is attached at one end to the sleeve 402. A hollow circular cylinder 406 (second member) surrounds the sleeve 402 and the two arms 405. The sleeve 402 is concentric with and overlaps a pedestal (base member) 407 and is able to slide axially with respect to the pedestal 407. The sleeve 402 has two notches 408 formed in its cylindrical wall at locations which correspond to the two arms 405. In this example the notches 408 (and arms 405) are diametrically opposite one another.

Each arm 405 is curved into an arc shape such that the axial force from the lock release mechanism which is applied at a first end 409 of the arm 405 is applied radially outwardly at a second end 410 of the arm 405. In the locked position shown in FIG. 4, this second end 410 presses against the inner wall of the hollow circular cylinder 406 in a region adjacent to the notch 408. This engagement prevents the arm 405 from moving which in turn prevents the sleeve 402 from moving which in turn prevents the lock release element from moving (and thus prevents the actuator from being released).

Two solenoids 411 (actuation devices) are provided for moving the hollow cylinder 406 between a first position in which it blocks movement of the arms 405 (a blocking position) and a second position in which movement of the arms 405 is not blocked (an unblocking position). Each solenoid 411 comprises a coil 412 and a plunger (or piston) 413 which moves axially within the coil 412 when the coil 412 is energized or de-energized. The plunger 413 pulls on a rod 416 attached to the cylinder 406. Two solenoids 411 are provided for redundancy as a safety measure. Activation of either one of the two solenoids 411 will cause movement of the cylinder 406 from the first position to the second position (i.e. from the blocking position to the unblocking position).

Figure 5:
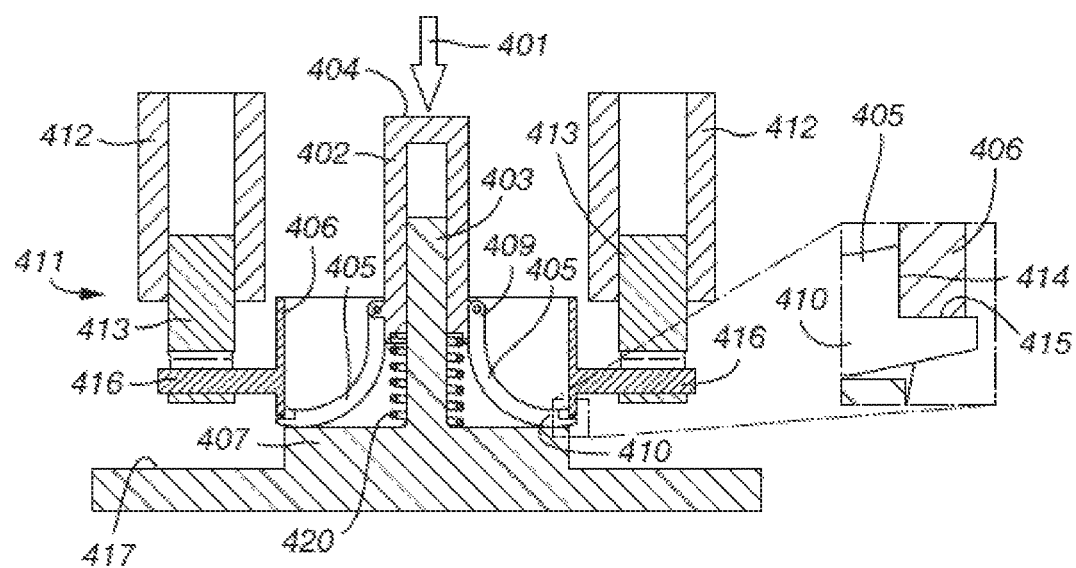
FIG. 5 shows the example of FIG. 4 in cross-section.

FIG. 5 shows the unlocking mechanism 400 in the first position (blocked position) as in FIG. 4, but in cross-section view.

The inset of FIG. 5 shows the second end 410 of one of the arms 405 to illustrate the engagement with cylinder 406 in more detail. The second end 410 is formed into an L-shape with a first outwardly directed face 414 and a second axially directed face 415 substantially perpendicular to the first face 414 and facing the hollow cylinder 406. The arm 405 is arranged such that its second end 410 projects into and preferably slightly through the notch 408. The first face 414 is biased by the lock release mechanism to press against the inner wall of the hollow cylinder 406, while the hollow cylinder 406 (specifically the top of the notch 408) rests on the second face 415. This arrangement provides for a very accurate determination of the friction that must be overcome during the unblocking process, i.e. the process for disengagement of the cylinder 406 from the arms 405 by moving it from its blocking position to its unblocking position so as to permit movement of the lock release element.

When one or both of the solenoids 411 are activated so as to move the cylinder 406 from its blocking position to its unblocking position, the only resistive forces that must be overcome are gravity (i.e. the weight of the cylinder 406) and the friction between the first faces 414 of the arms 405 and the inner wall of the cylinder 406. The gravitational force is generally small in comparison to the friction forces and therefore minimising the friction that must be overcome minimises the force required from the solenoid, which in turn allows a reduction in size of the solenoid and/or a reduction in the required accuracy of the solenoid calibration (i.e. it is no longer as necessary to position the solenoid's plunger within its coil accurately for the maximum solenoid force).

The axial extent and/or positioning of certain components are selected such that when the cylinder 406 rests on the second faces 415 of the arms 405, the lower edge of the cylinder 406 does not come into contact with a base member 417 (e.g. a housing part). The manufacturing tolerances of the cylinder 406 are taken into account in this selection process so that there is no contact even when the tolerances result in a cylinder 406 being manufactured slightly larger than intended. This ensures that the cylinder 406 is supported only by the second faces 415 and not by another support member 417 (e.g. housing part). If the cylinder 406 rested on another part, there would be no contact with the second face 415 and the area of contact between the cylinder 406 and the first face 414 would be reduced by an unpredictable amount depending on the particular tolerance of that cylinder 406. Therefore ensuring that the cylinder 406 rests on the second face 415 ensures a consistent and predictable area of contact (and therefore a consistent and predictable friction force) between the cylinder 406 and the first face 414. This in turn ensures that the release force required from the solenoid 411 is consistent and predictable which reduces the error margin required in the solenoid 411. Thus, once again the size (and weight) of the solenoid can be minimised without impacting adversely on the operation of the system.

Figure 6:
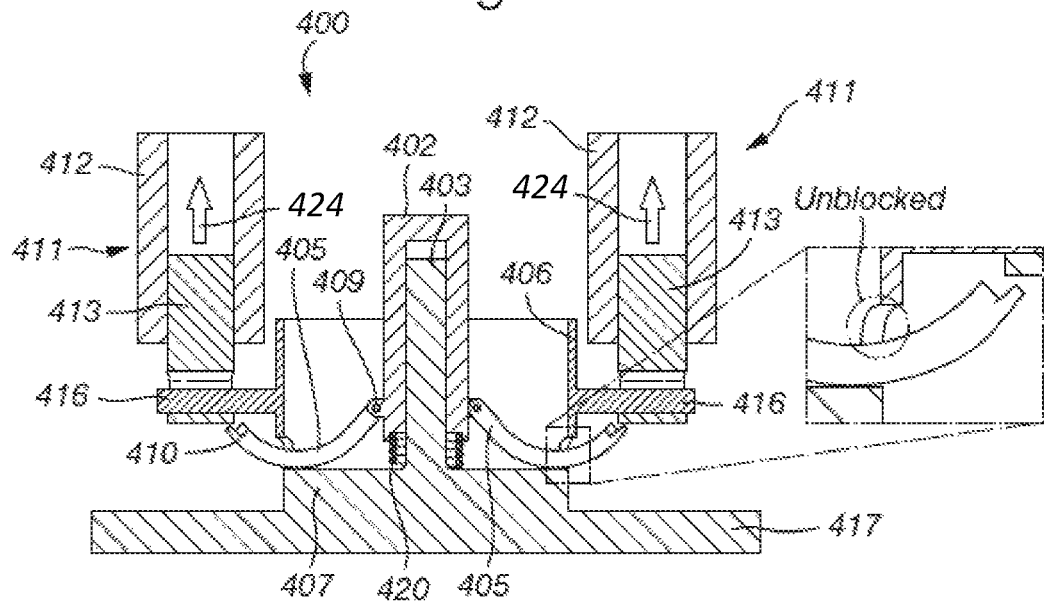
FIG. 6 shows an unlocking mechanism in the unlocked position.

FIG. 6 is similar to FIG. 5, showing a cross-section of the unlocking mechanism 400, but FIG. 5 shows the unlocking mechanism 400 in the unblocked state. As the solenoids 411 are activated, the coils 412 are energized and cause the plungers 413 to raise as indicated by arrows 424. The solenoids 411 provide a greater pulling force on the cylinder 406 than the frictional force between the cylinder 406 and the first faces 414 of arms 405. Therefore the cylinder 406 is lifted up and the biasing force on the sleeve 402 (from the lock release mechanism) pushes the sleeve 402 down and the arms 405 out through the notches 408. This movement of sleeve 402 permits movement of the lock release mechanism which in turn allows deployment of the RAT actuator. As the sleeve 402 is pressed downwards towards the pedestal 407, the arms 405 are pushed radially outward through the notches 408. The curved (or arcuate) form of the arms 405 allows them to rotate out through a small gap formed by the notch 408 without getting caught on the sleeve 406. This allows the axial sleeve movement to be relatively small, again allowing minimization of the size of the solenoids 411. Also, the curve shape of the arm 405 may be selected such that as the arm 405 moves past the cylinder 406 its curvature causes its unblocked end 410 to move into a space adjacent to the cylinder 406 and the solenoids 411. This space is not generally used for other components and thus the arrangement is compact and space efficient.

Figure 7:
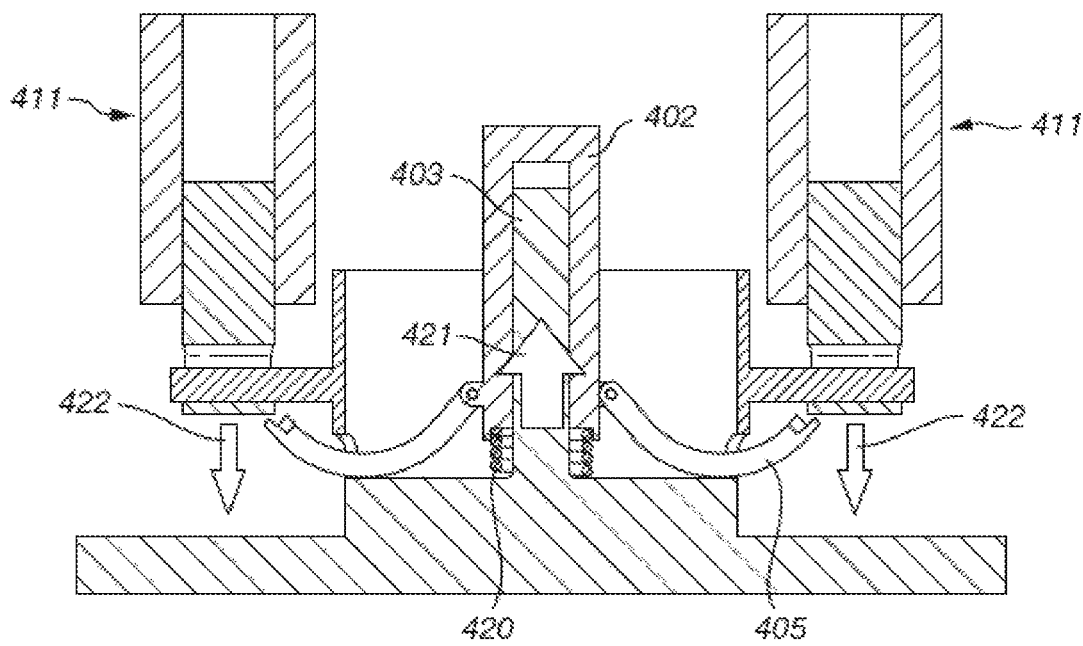
FIG. 7 illustrates the return to the locked position.

FIG. 7 is a cross-section similar to FIG. 6, but showing the return movement as the locking mechanism returns to the blocked position from the unblocked position. From the unblocked position shown in FIG. 7, the solenoids are deactivated and the sleeve 406 is released so that it can return to the blocking position as illustrated by the arrows 422. This may be accomplished by gravity in some examples, but in others a small return spring (not shown) may be provided. If used, this spring should preferably apply only a relatively weak force as the solenoids 411 would have to apply a force against it in order to perform the unblocking process. A spring 420 is also provided around the shaft 403 and under the sleeve 402. Spring 420 biases the sleeve 402 in the direction shown by arrow 421 and thus also biases the arms 405 back to the blocking position shown in FIGS. 4 and 5. The spring 420 must of course provide a lower upward force than the downward force provided by the lock release mechanism otherwise it would prevent movement of the sleeve 402 and prevent the unblocking process. As the arms 405 are drawn back inside the cylinder 406 through the notches 408, the cylinder falls back (or is biased back if the spring is used) such that it rests once again on the second faces 415 of the arms 405. This return action is possible due to the removal of the biasing force from the lock release mechanism as part of the RAT actuator deployment process. This biasing force will now be returned to the sleeve 402 until the RAT is retracted again, by which time the locking mechanism 400 will have returned to its blocked position ready for the next actuation.

In the above description, the term axial means with respect to the axis of the sleeve 402, cylinder 406, pedestal 407 and other generally cylindrical parts of the lock release mechanism and actuator.

It will be appreciated that in other examples the arms 405 could be attached directly to the lock release element without the need for a separate sleeve 402 and shaft 403.

The invention claimed is:

1. An actuator comprising a lock release element and an unlocking apparatus, the unlocking apparatus including:
   a first member; and
   a second member movable between a blocking position in which said second member is engaged with said first member so as to block movement of said first member and an unblocking position in which said second member is disengaged from said first member so that movement of the first member is not blocked;
   wherein the first member is a curved arm arranged such that in the blocking position it is disposed between said second member and the lock release element of said actuator; and
   wherein the first member is curved such that in use a blocking force from said second member in the blocking position is in a substantially different direction from an axial force applied by the lock release element to the first member.

2. The actuator as claimed in claim 1, wherein the curve shape is selected such that as the arm moves past the second member its unblocked end moves into a space adjacent to the second member.

3. The actuator as claimed in claim 1, wherein the second member is arranged to slide with respect to the first member when moving between the blocking and unblocking positions.

4. The actuator as claimed in claim 1, further comprising an unblocking actuation device arranged to move the second member from the blocking position to the unblocking position.

5. The actuator as claimed in claim 1, wherein the second member is a hollow cylinder with the first member arranged inside the cylinder.

6. The actuator as claimed in claim 5, further comprising a base member concentric with the cylindrical second member and overlapping therewith at least in the blocking position.

7. The actuator as claimed in claim 6, wherein in the blocked position, the curved first member is in contact with the base member.

8. The actuator as claimed in claim 5, wherein the cylindrical second member has a notch in its wall through which a portion of the first member projects when in the blocking position.

9. The actuator as claimed in claim 8, wherein the first member has a substantially L-shaped end that engages with the second member in the blocking position, one face of the L-shaped end being arranged to abut the inside wall of the second member to block movement of the first member, and the other face of the L-shaped end being arranged such that the notch of the second member rests thereon in the blocking position.

10. The actuator as claimed in claim 1, wherein the actuator is a RAT actuator.

11. A method of unlocking an actuator comprising:
   moving a second member from a first position in which it engages with a first curved member so as to block movement of said first member by providing a force in a direction substantially different from the direction of an axial force from a lock release mechanism of said actuator on the first curved member and a second position in which movement of the first member is not blocked.

12. A method as claimed in claim 11, wherein the curve shape of the first member is selected such that as the first member moves past the second member its unblocked end moves into a space adjacent to the second member.

13. A method as claimed in claim 11, wherein the second member slides with respect to the first member when moving between the blocking and unblocking positions.

14. An actuator comprising a lock release element and an unlocking apparatus, the unlocking apparatus including:
   a first member; and
   a second member movable between a blocking position in which said second member is engaged with said first member so as to block movement of said first member and an unblocking position in which said second member is disengaged from said first member so that movement of the first member is not blocked;
   wherein the first member is an arm arranged such that in the blocking position it is disposed between said second member and the lock release element of said actuator;
   wherein the second member is a hollow cylinder with the first member arranged inside the cylinder, and further comprising a base member concentric with the cylindrical second member and overlapping therewith at least in the blocking position;
   wherein in the blocked position, the first member is in contact with the base member.

* * * * *